United States Patent [19]

Rossa

[11] Patent Number: 4,750,289
[45] Date of Patent: Jun. 14, 1988

[54] DETACHABLE FISHING WEIGHT

[76] Inventor: Robert Rossa, 4106 E. Lakeshore Dr., Wonderlake, Ill. 60097

[21] Appl. No.: 64,580

[22] Filed: Jun. 22, 1987

[51] Int. Cl.$^4$ .............................................. A01K 95/00
[52] U.S. Cl. ................................................... 43/44.96
[58] Field of Search .................. 43/43.12, 44.96, 43.14, 43/43.15

[56] References Cited

U.S. PATENT DOCUMENTS

| 2,589,715 | 3/1952 | Lysikowski | 43/43.14 |
| 3,137,962 | 6/1964 | Linley | 43/44.96 |
| 3,461,597 | 8/1969 | Hobson | 43/43.14 |
| 4,161,838 | 7/1979 | Gapen | 43/42.11 |
| 4,314,420 | 2/1982 | Dickinson | 43/42.39 |
| 4,428,144 | 1/1984 | Dickinson | 43/44.96 |
| 4,467,550 | 8/1984 | Haulk | 43/43.12 |

Primary Examiner—Gene P. Crosby
Attorney, Agent, or Firm—Douglas B. White

[57] ABSTRACT

There is provided a detachable fishing weight device having an axial mounting wire maintaining a bend in the mid portion thereof. Fishing weights of different size and hydro dynamic shape and having a through hole therein are mounted on the axial wire and forced past the bend by a slight straightening of the wire. Once mounted they are restrained by the bend. In a further embodiment there is provided a clip mechanism for spanning the mounted weight and engaging the mounting wire to secure the weight from removal.

4 Claims, 1 Drawing Sheet

DETACHABLE FISHING WEIGHT

BACKGROUND OF THE INVENTION

1. Field of the Invention

The present invention relates generally to fishing equipment and particularly weights for holding fishing tackle near the bottom of a body of water. More specifically, the present invention relates to detachable fishing weights which may be removed and replaced with weights of different size to accomodate varying conditions while fishing.

2. Description of the Prior Art

The fishing weights of the prior art are commonly used to sink fishing tackle near or on the bottom of a body water. Typically, these weights are formed out of lead and provided with an eyelet by which they are tied to the fishing tackle. When the wind, current or drift speed change, a larger or smaller weight is usually required in order to maintain the correct positioning of the fishing tackle. This requires an individual to tie onto the tackle a new width and remove the old, a time consuming process.

Recent improvements in the art have included means to release a fishing weight from a line when it becomes snagged and entangled. In U.S. Pat. No. 3,740,803 there is described a V-shaped device which yields under the stress of a snagged weight and thereby pulls out of a center hole in the fishing weight. Similarly, in U.S. Pat. No. 4,467,550 there is described an axial wire arranged to fit within a hole in a fishing weight and retain the weight with frictional fit. As a result, when the weight becomes snagged the wire will forceably pull out of the fishing weight.

Neither of these devices disclose means for preventing the snags, nor means for selectively and absolutely restraining the release of the weight when an individual does not want the weight to release under snag conditions. Most importantly, neither device allows easy interchange of weights to aid the fisherman in adapting the tackle to varying conditions, nor do these devices aid the individual in achieving the desired positioning of the bait above the bottom of the body of water without retying the weight.

Accordingly, it is an object of the present invention to provide a fishing weight attachment and release means operative in one embodiment to release a snagged weight from a fishing line without destroying or losing the tackle and to retain the weight during casting and retrieving.

It is yet a further object of the present invention to provide means for easy interchangeability of fishing weights to accomodate varying conditions.

It is still another object of the present invention in yet another feature to provide selective and secure means for attaching and restraining the fishing weight to prevent release even under snag conditions.

It is also an object of the present invention to provide interlocking means to secure the weight to the mounting wires to prevent loose movement therebetween.

And finally, in yet another feature, it is an object of the present invention to provide mechanical means for maintaining the fishing weight at a predefined elevation above the bottom of a body of water to prevent snagging therein and means to adjust that elevation without retying the weight.

These and other objects of the invention will be apparent from the following detailed description and upon reference to the drawings.

SUMMARY OF THE INVENTION

Generally, in the preferred embodiment of the present ivnention, there is provided an axial mounting wire of predefined length having a resilient bend about a mid portion thereof. A plurality of hydro dynamic fishing weights of different sizes, each with an axial hole therethrough, are arranged to be mounted upon the axial wire. In mounting the fishing weight, when the axial wire is inserted and the weight approaches the bend in the mounting wire it is prevented from further movement due to the size of the hole in the weight and the angle of bend. Accordingly, when the wire is resiliently strained and straightened it allows the fishing weight to slide over the bend, and the wire is then allowed to regain its original shape to thereby restrain the weight from removal.

In a further embodiment there is provided from the generally upward projecting portion of the mounting wire, near its point of attachment to the fishing tackle, a clip member, also wire in nature, extending toward the bend in the mounting wire. This clip member is arranged to releasably engage the mounting wire after the fishing weight is in place. Additionally, due to an increased diameter in a mid portion of the fishing weight, the clip member is prevented from releasing when the fishing weight is in position near the clip attachment point, but the clip is allowed to release when the fishing weight is shifted upwards toward the extremity of the mounting wire.

BRIEF DESCRIPTION OF THE DRAWINGS

For a more complete understanding of this invention reference should now be had to the embodiment illustrated in greater detail in the accompanying drawings and described below by way of an example of the invention. In the drawings.

While the invention will be described in connection with a preferred embodiment, it will be understood that I do not intend to limit the invention to that embodiment. On the contrary, I intend to cover all alternatives, modifications, and equivalents as may be included within the spirit and scope the invention as defined by the appended claims.

DESCRIPTION OF THE PREFERRED EMBODIMENT

Figure 1:
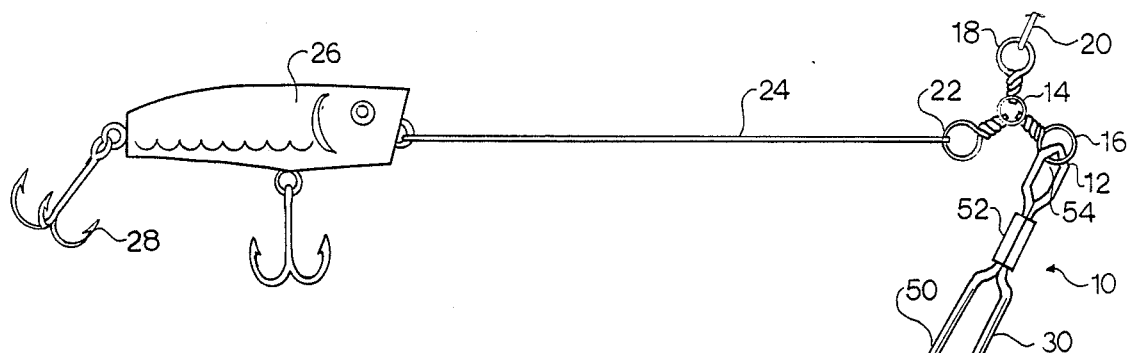
FIG. 1 is a perspective view of the detachable fishing weight device of the present invention attached to the fishing tackle and line.

Turning first to FIG. 1 there is shown a detachable fishing weight device of the present invention indicated generally by the numeral 10 carrying in its upper extremity 12 a triple eyelet mounting 14. This triple eyelet is arranged with a first eyelet 16 engaged with the mounting end of the detachable fishing weight device, and a second eyelet 18 connected to the fishing line 20 leading to the traditional fishing pole and reel. On the third eyelet 22 there is provided a line 24 leading to the bait or lure 26 and presenting hooks 28.

A weight used in this fashion traditionally maintains the bait or lure near the bottom of the body of water and thereby presents the bait or lure at the proper depth. To maintain a more precise depth control and to provide means for raising the weight above common snags there is provided a long fishing weight mounting wire 30 having a protruding extremity 32 designed to drag or touch the bottom of the body of water and to support the weight at a selected height above the bottom. The height of the weight may be adjusted by changing the length of the free end of wire or adjusting the degree of bend 34 provided in the mid section thereof. Moreover, it has been found that this bent mounting retards spinning or winding of the weight and maintains the disposition as shown in FIG. 1 throughout use due to its gravitational and inertial response.

Figure 3:
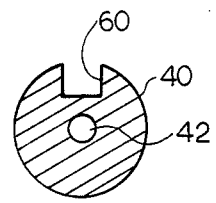
FIG. 3 is a cross sectional view of the fishing weight of the present invention showing, as yet a further feature, a groove exhibited along the length of the fishing weight for mating engagement with the clip member.

The hydro dynamic shaped weighted member 40 shown in cross section in FIG. 3 has a center axial hole 42 arranged to accept the mounting axial wire 30 and to be supported thereon. To mount the weighted member the free end 32 of the supporting wire is positioned within the hole and the weighted member is slid along the mounting wire until reaching the bend 34. The mounting wire must then be flexed to a straightened alignment to allow the weighted member to pass thereby. Once beyond the bend 34 the mounting wire is allowed to regain its bend thereby restraining the weighted member in place.

At this point additional bend may be manually added to adjust the elevation of the weight above the bottom of the body of water. With this arrangement the fishing weight is now held in position sufficiently for secure casting and retrieval of the line. Additionally, under normal circumstances and even during use in some weeds the weight will not release from the mounting. However, if the weight should become caught in a crevice or hopelessly entangled in weeds it will be pulled toward the bend of the mounting wire, whereupon under force of the snag it will cause the wire to straighten. Further force on the weight will cause it to eventually slip off, preventing the line from breaking and thereby saving the fishing tackle.

To accomodate varying conditions while fishing, when retreived into the boat the size of the weight may be changed as desired. This is accomplished by sliding the weight to the bend of the mounting wire, slightly straightening the resilient bend in the wire and then removing the weight from the mounting wire past the bend.

In a further embodiment of the present invention there is provided a clip mechanism for locking and preventing removal of the weighted member regardless of the snag force applied thereto. This clip is preferrably formed from the same wire which forms the mounting wire for the weighted member and is comprised of a bent extension 50 thereof. To form the bend the wire is crimped and held by a sleeve 52 arranged to secure the bend but allow spring action in the wire extension 50. Moreover, the sleeve acts to form an attaching eyelet portion 54 out of the bent wire. At the free extremity, the clip extension 50 is formed into a hook 56 arranged to encircle the wire mounting member and thereby restrain the weighted member from sliding past the bend.

Figure 2:
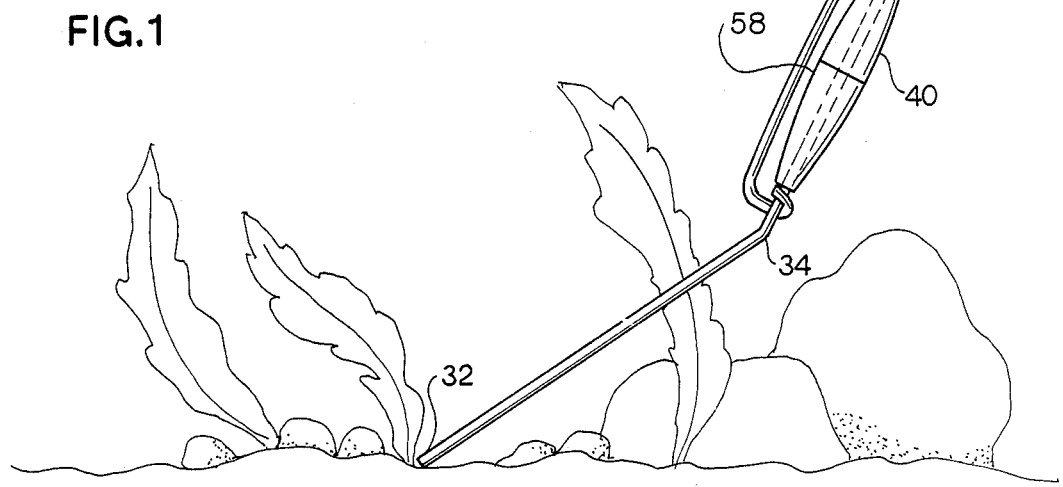
FIG. 2 is a perspective view of the detachable fishing weight of FIG. 1 showing the restraining clip released and the weight in position for withdrawal from the mounting wire.
Figure 2:
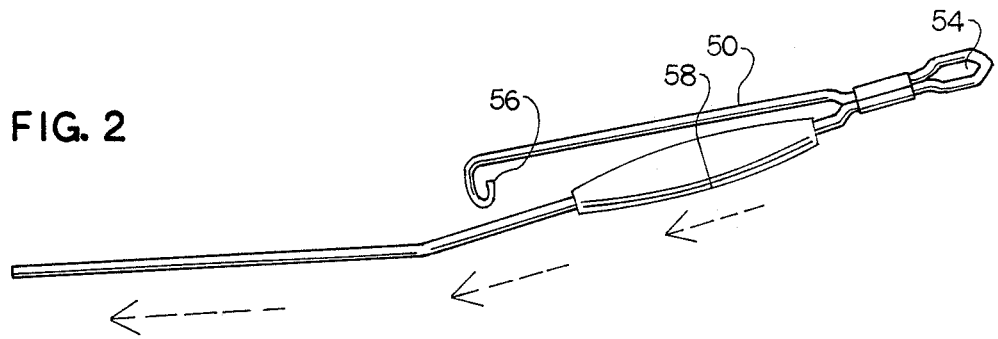

In a further unique feature of this clip and weight assembly, an increased diameter 58 of the weighted member serves to prevent movement of the clip extension and thereby prevent the release of the clip when the weighted member is positioned proximate the hooked attachment. When the weighted member is moved upwards to a position proximate the sleeve 52 (FIG. 2), sufficient movement of the hook end 56 of the clip occurs to allow it to become disengaged. Once the hook is disengaged the weighted member may be slid along the mounting wire, past the bend and removed as described before. But after the weight is mounted and the clip fastened, the weight may be positioned near the hook end 56 to block movement of the clip and prevent release as shown in FIG. 1.

In yet another feature and further embodiment of the present invention, there is provided a groove 60, shown in cross section in FIG. 3, exhibited along the length of the weighted member. This groove is arranged to engage the clip member when hooked about the mounting wire as described. In that position the wire extension 50 is caused to engage the longitudinal slot 60 and prevent rotation of the weighted member about the mounting wire. This groove and wire engagement can also be used, by varying the dimensions, to create a cam-lock system. The groove in that mode of operation is aligned with the clip wire 50 during engagement of the hook end with the wire support member. But once the hook end is engaged, the weighted member would be rotated to thereby block motion of the wire extension necessary to unhook the engagement.

From the foregoing description, it will be apparent that modifications can be made to the apparatus and method for using same without departing from the teaching of the present invention. Accordingly the scope of the invention is only to be limited as necessitated by the accompanying claims.

I claim:

1. A detachable fishing weight device for attachment to a fishing line comprising:
   a wire support member having a first extremity arranged for attachment to the fishing line, and a free protruding end at the second extremity thereof;
   clip means extending from the first extremity, spanning a portion of said wire support member and arranged to releasably fasten to said wire support member;
   a weighted member having a through hole defined therein and mounted upon said wire support member, wherein said wire support member protrudes through said hole in said weighted member, and further comprising a longitudinal groove defined along one side of said weighted member and arranged to engage said clip means, whereby said clip means may be releasably engaged with said wire support member to restrain said weighted member.

2. The device of claim 1 wherein said wire support member exhibits a flexible resilient bend in the portion of the wire member exposed below the mounting of the weighted member, whereby the wire support member may be partially straightened during mounting of the weighted member, but regains its bend to restrain the weighted member after mounting.

3. A detachable fishing weight device for attachment to a fishing line comprising:

a wire support member having a first extremity arranged for attachment to the fishing line, and a free protruding end at the second extremity thereof;

clip means extending from the first extremity, spanning a portion of said wire support member and arranged to releasably fasten to said wire support member;

a weighted member having a through hole defined therein and mounted upon said wire support member, wherein said wire support member protrudes through said hole in said weighted member, whereby said clip means may be releasably engaged with said wire support member to restrain said weighted member, and wherein said weighted member further comprises a portion of increased diameter arranged to prevent release operation of said clip means when said weighted member is positioned in a first position proximate said engagement of said clip means with said wire support member, but arranged to allow release operation of said clip means when said weighted member is positioned in a second position shifted away from said first position.

4. The device of claim 3 further comprising a longitudinal groove along one side of said weighted member, whereby said clip means is arranged to fit within groove to allow said clip means to engage said wire support member but to retract out of said groove when said clip means is engaged with said wire support member, whereby said weighted member may be rotated about said wire support member to move said groove out of engaging position with said clip means to prevent release thereof.

* * * * *